Jan. 5, 1954

P. C. BAKER 2,664,713

AUTOMATIC IRRIGATION DAM

Filed Aug. 1, 1950

Porter Chester Baker
INVENTOR.

BY *Clarence A. O'Brien*
*and Harvey B. Jacobson*
Attorneys

Jan. 5, 1954

P. C. BAKER 2,664,713

AUTOMATIC IRRIGATION DAM

Filed Aug. 1, 1950

Porter Chester Baker
INVENTOR.

BY *Clarence A. O'Brien*
*and Harvey B. Jackson*
Attorneys

Patented Jan. 5, 1954

2,664,713

UNITED STATES PATENT OFFICE 2,664,713

AUTOMATIC IRRIGATION DAM

Porter Chester Baker, Nampa, Idaho

Application August 1, 1950, Serial No. 177,062

1 Claim. (Cl. 61—29)

This invention relates to dams and particularly to that type utilized for controlling the flow of water through irrigating ditches.

An object of this invention resides in the provision of a dam of the type for controlling the flow of water through irrigation ditches which includes means for automatically opening the dam at the expiration of a predetermined time so as to permit the flow of water through the ditch beyond the dam to a desired point, and is an improvement over Patent No. 1,080,944.

Another object of this invention is to provide a dam of the type described which has a novel trigger release means for permitting or preventing the flow of water past the dam.

Still further objects of the invention reside in the provision of an automatic irrigation dam that is strong, durable, highly efficient in operation, simple in construction and manufacture, capable of being readily installed on various sized irrigation ditches, and which is relatively inexpensive to manufacture.

These, together with the various ancillary objects of the invention which will become apparent as the following description proceeds, are obtained by this automatic irrigation dam, a preferred embodiment of which has been illustrated in the accompanying drawings, by way of example only, wherein.

Figure 1:
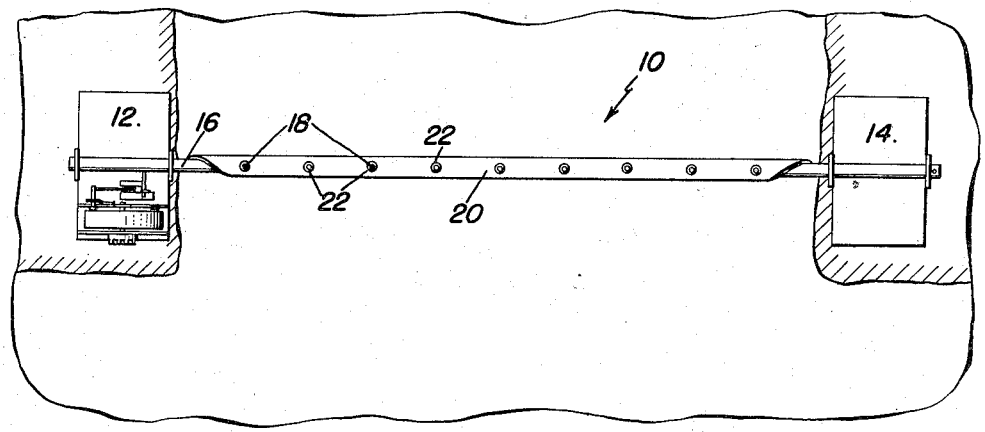
Figure 1 is a top plan view of the automatic irrigation dam.
Figure 6:
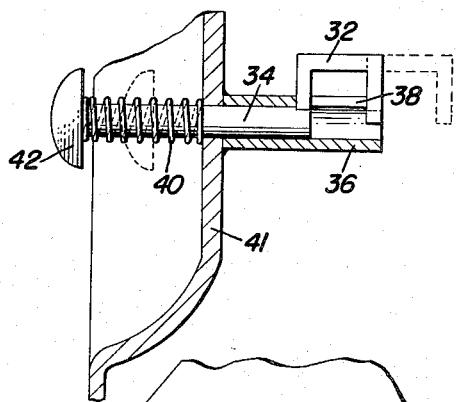
Figure 6 is an enlarged sectional detail as taken along line 6—6 in Figure 5.
Figure 5:
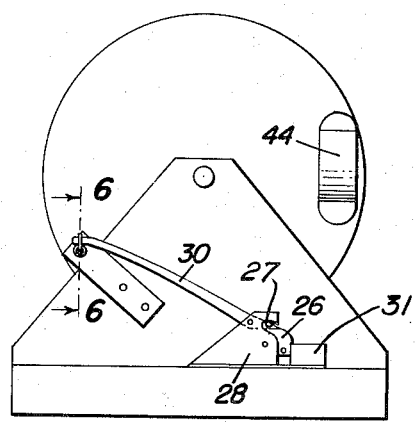
Figure 5 is an elevational view showing the construction of the trigger release mechanism used in the present invention.
Figure 7:
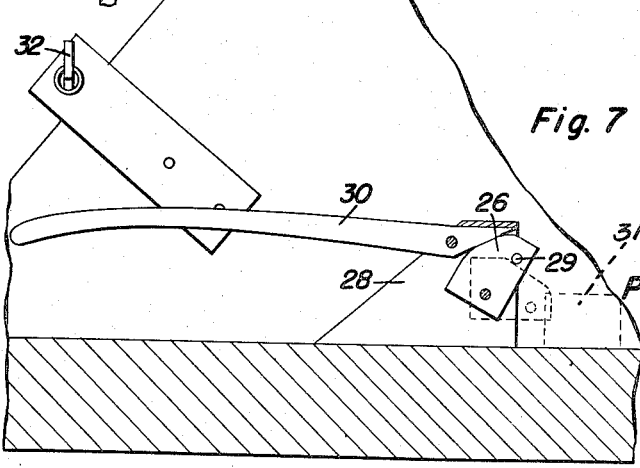
Figure 7 is an enlarged sectional view showing the construction of the lever and trigger release mechanism comprising elements of the present invention.

With continuing reference to the accompanying drawings wherein like reference numerals designate similar parts throughout the various views, reference numeral 10 is used to generally designate the automatic irrigation ditch dam comprising the present invention which is mounted on support blocks 12 and 14 secured on the opposite sides of the ditch. Journaled in the support blocks 12 and 14 is a rockable shaft 16 which has a plurality of upwardly extending pins 18 over which a fabric sheet forming the dam or flexible gate and indicated at 20 is adapted to be emplaced, the sheet being provided with grommets 22 capable of being slidably received on the pins 18.

Secured to the shaft 16 is a locking pin 24 which is adapted to be engaged and locked in place so as to hold the sheet 20 in a closed position. The pin 24 is held in place between an upstanding bracket 28 and an adjacent guide 31 by means of the cam-like trigger member 26 which is journaled on the bracket 28, on which bracket a lever 30 is also pivotally mounted. The trigger member 26 is provided with a stop pin 29 for engagement in a notch 27 provided therefor in the bracket 26 for limiting the swinging movement of said trigger member toward open position. Upon release of the trigger member 26 by the lever 30, the pin 24 will be released thus permitting the shaft 16 to rotate.

Figure 2:
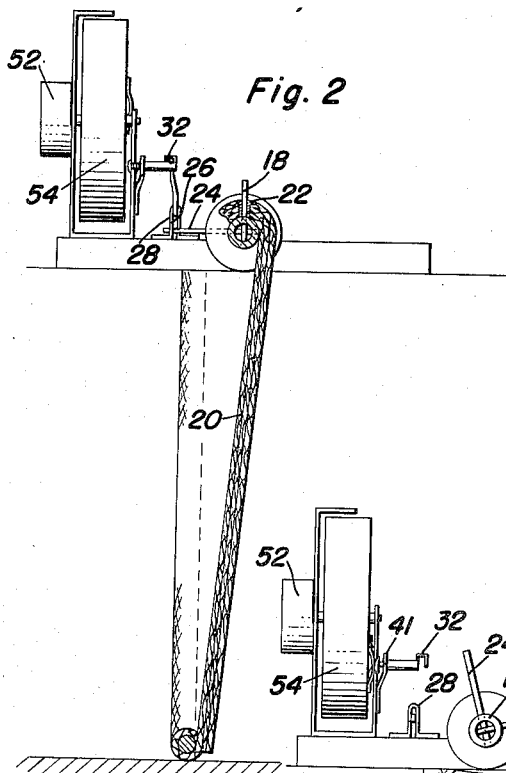
Figure 2 is a vertical sectional view showing the dam in a closed position.
Figure 4:
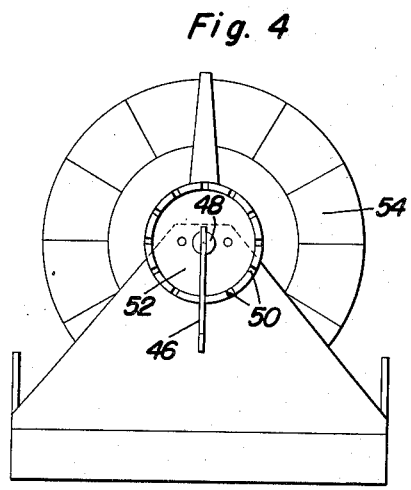
Figure 4 is an elevational view showing the construction of the clockwork mechanism for actuating the dam.
Figure 3:
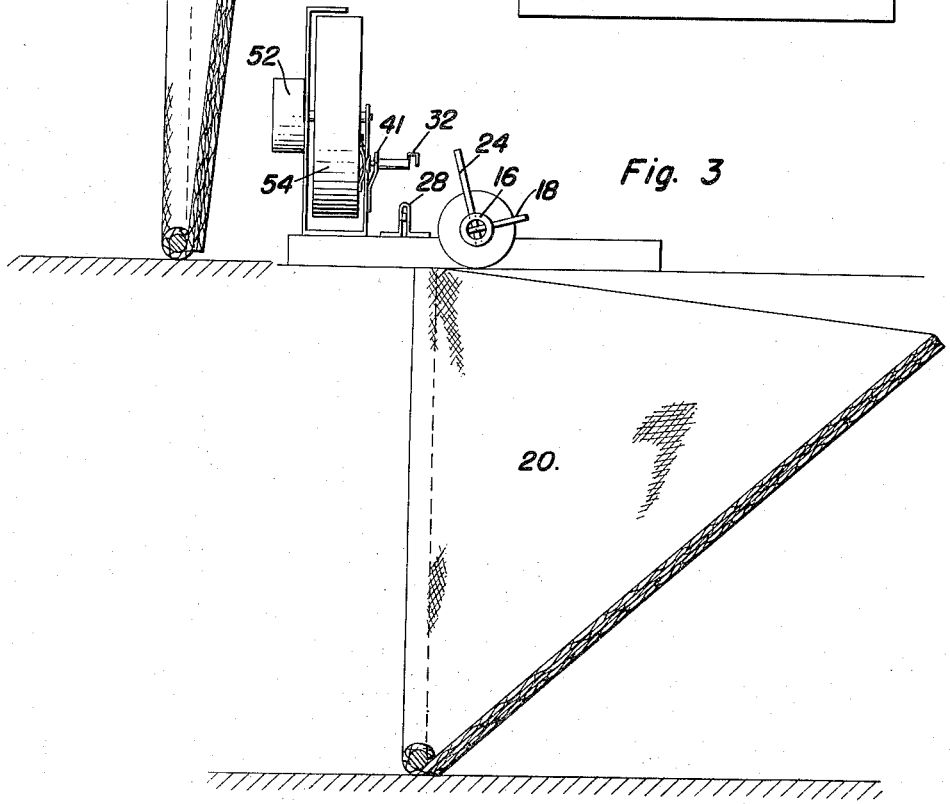
Figure 3 is a side elevational view showing it in an open position with respect to the main irrigating ditch.

The lever 30 is held in the closed position by means of the release mechanism which includes a U-shaped catch or yoke 32 secured to one end of a rod 34 which is slidably received within a tubular member 36. The tubular member 36 is provided with a slot 38 into which the U-shaped catch 32 may slide. Continuously urging the catch inwardly of the slot 38 is a spring 40. The spring 40 biases the plate 41 on which the tubular member 36 is mounted and the head 42 of the rod 34. The lever 30, when in raised position, rests on the element 36 (see Fig. 2) and is retained thereon by the catch or member 32. This is done by depressing the head 42 so as to urge the catch 32 outwardly of the tubular member 36 and then placing the lever 30 within the confines of the latch member 32 and then releasing said head to permit the spring 40 to retract the rod or shaft 34. Hence, when the head 42 is again depressed, the lever 30 will be pushed off the free end of the element 36 and permitted to fall, thus releasing the dam. There is sufficient looseness or "play" in the pivotal mounting of the lever 30 to permit this operation. A contact member 44 is provided for actuating the head 42 of the rod 34 and is set by means of a lever 46 which is mounted on a shaft 48 to which the catch member 44 is attached. The latch member 46 is engageable within any of a series of grooves 50 formed in a disk 52 so as to correspond to any one of the hours of a twelve hour period. Hence, upon rotation of the lever 46 from one location to another, the clockwork mechanism generally indicated by reference numeral 54 will rotate and at the predetermined interval will permit the contact member 44 to contact the head 42 to thus release the lever 30.

Since from the foregoing the construction and advantages of this automatic irrigation dam are readily apparent, further description is believed to be unnecessary.

However, since numerous modifications will readily occur to those skilled in the art after a consideration of the foregoing specification and accompanying drawings, it is not intended to limit the invention to the precise embodiment shown and described, but all suitable modifications and equivalents may be readily resorted to which fall within the scope of the appended claim.

Having described the invention, what is claimed as new is:

An irrigation canal dam comprising a support, a rockable gate supporting shaft journaled on the support, means on the shaft for detachably securing the upper portion of a flexible gate thereto to be supported in closed position thereby upon rotation of said shaft in one direction, a pin on the shaft, a tube on the support having a longitudinal slot therein, a bracket on the support, a trigger pivotally mounted on said bracket and engageable with the pin for releasably securing the shaft against rotation in the opposite direction, a lever pivotally mounted on the bracket and engaged at one end with the trigger for releasably securing same in operative position, the other end portion of said lever being engageable on the tube for retention thereby in operative position, a rod slidable in the tube, a yoke on the rod operable in the slot and straddling the lever for operatively connecting the rod thereto, and means for actuating the rod for disengaging the lever from the tube and releasing the trigger for freeing the shaft for rotation in said opposite direction.

PORTER CHESTER BAKER.

References Cited in the file of this patent

UNITED STATES PATENTS

| Number | Name | Date |
|---|---|---|
| 1,080,944 | Baker | Dec. 9, 1913 |
| 1,237,107 | Shaffer | Aug. 14, 1917 |